United States Patent
Negishi et al.

(10) Patent No.: US 8,671,230 B2
(45) Date of Patent: Mar. 11, 2014

(54) DATA TRANSFER DEVICE AND DATA TRANSFER METHOD

(75) Inventors: Tatsuhiko Negishi, Kawasaki (JP); Kenji Shirase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 199 days.

(21) Appl. No.: 13/225,870

(22) Filed: Sep. 6, 2011

(65) Prior Publication Data
US 2012/0096195 A1 Apr. 19, 2012

(30) Foreign Application Priority Data
Oct. 15, 2010 (JP) ................. 2010-233019

(51) Int. Cl.
*G06F 13/00* (2006.01)

(52) U.S. Cl.
USPC ........................................... 710/34

(58) Field of Classification Search
USPC ........................................... 710/34
See application file for complete search history.

(56) References Cited

U.S. PATENT DOCUMENTS

| 5,434,872 | A | * | 7/1995 | Petersen et al. | 714/811 |
| 7,269,666 | B1 | * | 9/2007 | Leitner et al. | 709/250 |
| 7,567,567 | B2 | | 7/2009 | Muller et al. | |
| 7,656,887 | B2 | | 2/2010 | Okuno | |

FOREIGN PATENT DOCUMENTS

| JP | 2001-217837 | 8/2001 |
| JP | 2006-135572 | 5/2006 |
| WO | WO-94-02891 A1 | 2/1994 |
| WO | WO-2006-083835 A2 | 8/2006 |

OTHER PUBLICATIONS

Extended European Search Report dated Dec. 23, 2011 for corresponding European Application No. 11183521.1.

* cited by examiner

*Primary Examiner* — Chun-Kuan Lee
(74) *Attorney, Agent, or Firm* — Fujitsu Patent Center (57) ABSTRACT

A data transfer device includes a storage controller that stores received response data in a buffer with respect to each piece of identification information included in the response data when receiving the response data from a first device, the response data being transferred from the first device in response to a transfer request transferred from a second device, a counting unit that counts a number of pieces of the response data stored in the buffer by the storage controller with respect to each piece of the identification information, and a determination unit that determines whether the number counted by the counting unit reaches a specified value preliminarily set with respect to each piece of the identification information.

4 Claims, 6 Drawing Sheets

DATA TRANSFER DEVICE AND DATA TRANSFER METHOD

CROSS-REFERENCE TO RELATED APPLICATION

This application is based upon and claims the benefit of priority of the prior Japanese Patent Application No. 2010-233019 filed on Oct. 15, 2010, the entire contents of which are incorporated herein by reference.

FIELD

The embodiment discussed herein is related to a data transfer device and a data transfer method.

BACKGROUND

In the past, data transfer devices have been known, each of which receives response data, transferred from a second device in response to a transfer request transferred from a first device, from the second device, and transfers the received response data to the first device.

In many cases, such data transfer devices may adopt First In First Out (FIFO) methods as data transfer methods, in view of controllability. The FIFO method is a data transfer method in which data stored in a storage region such as a buffer or the like is sequentially read out beginning with the chronologically oldest stored data and transferred.

Specifically, when having received response data from the second device, a data transfer device adopting the FIFO method stores the received response data in a buffer with respect to each tag used for identifying the response data. In addition, the data transfer device reads out data in order, from a buffer corresponding to the tag of the first received response data, and transfers the data to the first device.

An example of such a technique is disclosed in Japanese Laid-open Patent Publication No. 2006-135572.

However, in the above-mentioned data transfer device of the related art, it is not desirable that the throughput of the device is lowered.

Specifically, since the above-mentioned data transfer device of the related art adopts the FIFO method, it is difficult for the data transfer device to read out and transfer response data to the first device, in some cases, even if the data storage amount of a buffer corresponding to the tag of response data reaches a preliminarily set upper limit value. For example, even if the data storage amount of a buffer corresponding to response data A reaches the upper limit value, it is difficult to transfer the response data A prior to response data B when the storage amount of a buffer corresponding to the response data B received before the response data A does not reach the upper limit value. In this case, in the above-mentioned data transfer device of the related art, the transfer of response data to the first device is delayed, and the throughput of the device is lowered.

SUMMARY

According to an aspect of an embodiment, a data transfer device includes a storage controller that stores received response data in a buffer with respect to each piece of identification information included in the response data when receiving the response data from a first device, the response data being transferred from the first device in response to a transfer request transferred from a second device, a counting unit that counts a number of pieces of the response data stored in the buffer by the storage controller with respect to each piece of the identification information, a determination unit that determines whether the number counted by the counting unit reaches a specified value preliminarily set with respect to each piece of the identification information, and a transfer unit that reads out, from the buffer, the response data corresponding to the identification information in which the number of the corresponding response data being determined to reach the specified value by the determination unit, and transfers the read response data to the second device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of a data transfer device and a data transfer method disclosed in the present application will be described in detail on the basis of figures. In the following embodiments, an example will be described in which the data transfer device disclosed in the present application is applied to a data transfer device such as a Root Complex or the like compliant with a PCI Express (PCIe) standard. In addition, it may be understood that the disclosed technique is not limited by the embodiments.

Figure 1:
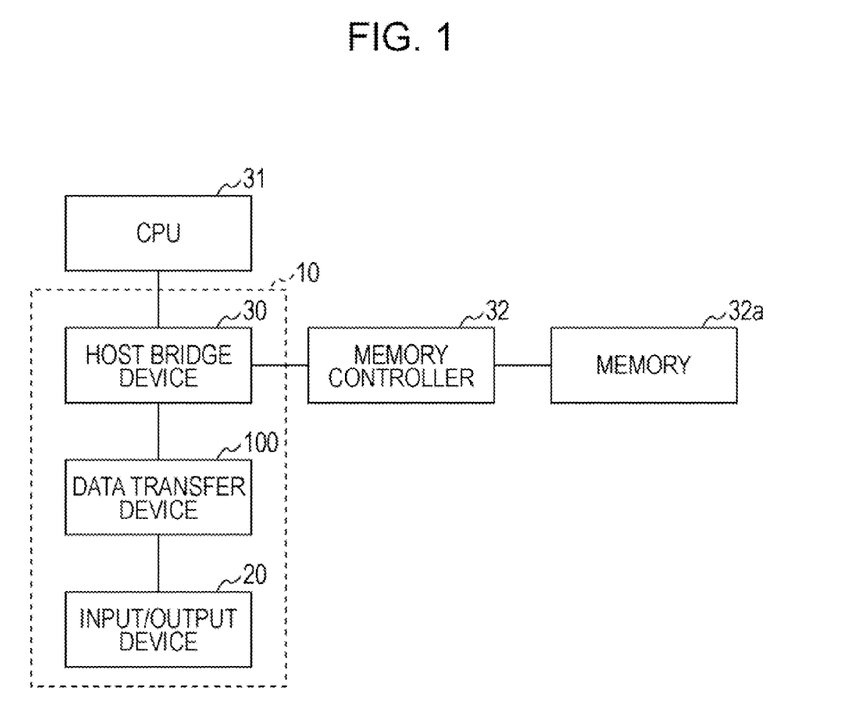
FIG. 1 is an explanatory diagram illustrating an example of a configuration of a system including a data transfer device according to the present embodiment.

First, using FIG. 1, an example of the configuration of a system including the data transfer device according to the present embodiment will be described. FIG. 1 is an explanatory diagram illustrating an example of the configuration of the system including the data transfer device according to the present embodiment. As illustrated in the figure, a system 10 according to the present embodiment includes a data transfer device 100, an input/output device 20, and a host bridge device 30.

The data transfer device 100 controls data communication performed between the input/output device 20 and the host bridge device 30. The data transfer device 100 generates a plurality of requests according to a predetermined protocol, from a request packet transferred from the input/output device 20, and sequentially transfers the generated requests to the host bridge device 30. In addition, the data transfer device 100 generates a response packet including data transferred from the host bridge device 30 in response to the request, and transfers the generated response packet to the input/output device 20.

The input/output device 20 corresponds to various kinds of devices such as a disk device, a network interface device, and the like. The input/output device 20 generates a request packet used for requesting the transfer of data, and transfers the generated request packet to the data transfer device 100. The request packet includes pieces of information such as a command, a tag, and the like. The command is information indicating various kinds of instructions for the host bridge device 30. The tag is information used for associating the request packet with the response packet, and is identification information used for identifying the request packet.

The host bridge device 30 is a device that connects a CPU 31 and a memory controller 32 to each other and controls data communication between the both of them. The CPU 31 is an arithmetic device that executes various kinds of arithmetic processing operations. The memory controller 32 is a control device that controls reading and writing data from and into a memory 32a, in accordance with an instruction from the CPU 31. When having received a request from the data transfer device 100, the host bridge device 30 requests the CPU 31 to acquire data corresponding to the request from the memory 32a, and transfers the acquired data to the data transfer device 100. Hereinafter, it is assumed that data transferred from the host bridge device 30 to the data transfer device 100 in accordance with the request is called "response data" and the command, the tag, and the data transferred to the data transfer device 100 are collectively called "response packets".

In addition, according to the terms of PCIe that is the specification of an input/output bus widely available at present, the data transfer device 100 corresponds to a Root Complex. In addition, the input/output device 20 corresponds to an End Point. In addition, the host bridge device 30 corresponds to a System Controller.

Figure 2:
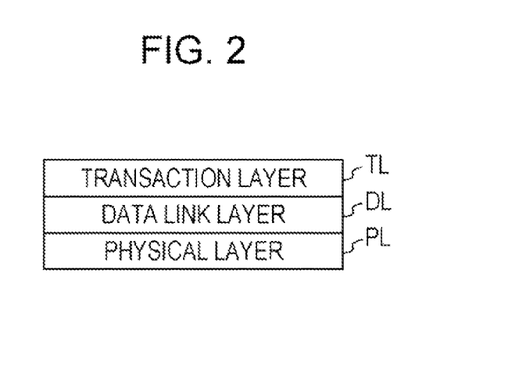
FIG. 2 is a diagram illustrating a hierarchical structure of data transfer in PCIe.

Here, the hierarchical structure of data transfer in PCIe and a packet structure in PCIe will be briefly described. FIG. 2 is a diagram illustrating the hierarchical structure of the data transfer in PCIe, and FIG. 3 is a diagram illustrating the packet structure in PCIe.

As illustrated in FIG. 2, in PCIe, with respect to the data transfer, a 3-layer structure is defined that includes a transaction layer TL, a data link layer DL, and a physical layer PL. Devices such as the data transfer device 100, the host bridge device 30, and the input/output device 20, compliant with the PCIe standard, include communication functions based on the 3-layer structure.

Figure 3:
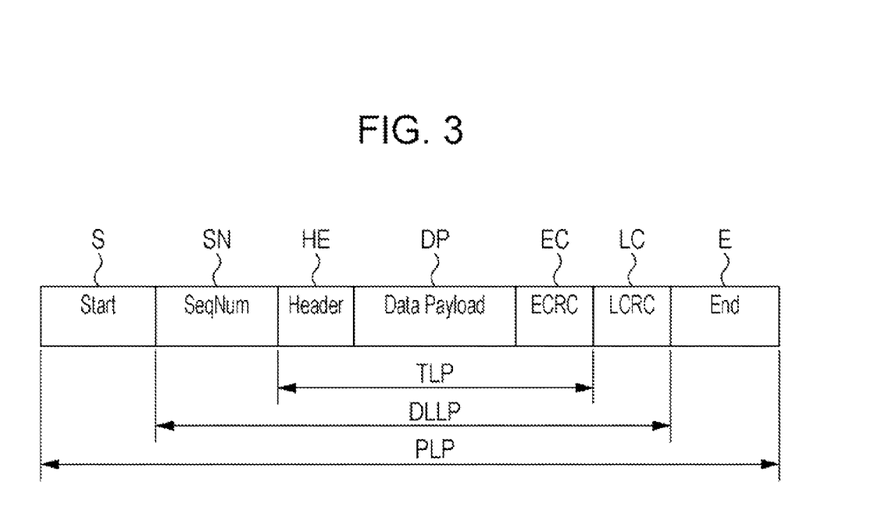
FIG. 3 is a diagram illustrating a packet structure in PCIe.

As illustrated in FIG. 3, in the transaction layer TL, a transaction layer packet (TLP) is generated that includes header information (Header) HE, a data payload DP, and End-to-end Cyclic Redundancy Checking (ECRC) data EC. The header information HE includes various kinds of information such as a command, a tag, and the like. The data payload DP includes data to be transmitted. The ECRC data EC is an error correction code (cyclic code) calculated on the basis of the header information HE and the data payload DP.

As illustrated in FIG. 3, in the data link layer DL, a sequence number (SeqNum) SN is added to the front end portion of TLP. In addition, Link Cyclic Redundancy Checking (LCRC) data LC that is an error correction code (cyclic code) calculated on the basis of the sequence number SN and TLP is added to the rear end portion of TLP. Accordingly, a data link layer packet (DLLP) is generated.

As illustrated in FIG. 3, in the physical layer PL, a start code (Start) S is added to the front end portion of DLLP, and an end code (End) E is added to the rear end portion of DLLP. Accordingly, a physical layer packet (PLP) is generated.

Figure 4:
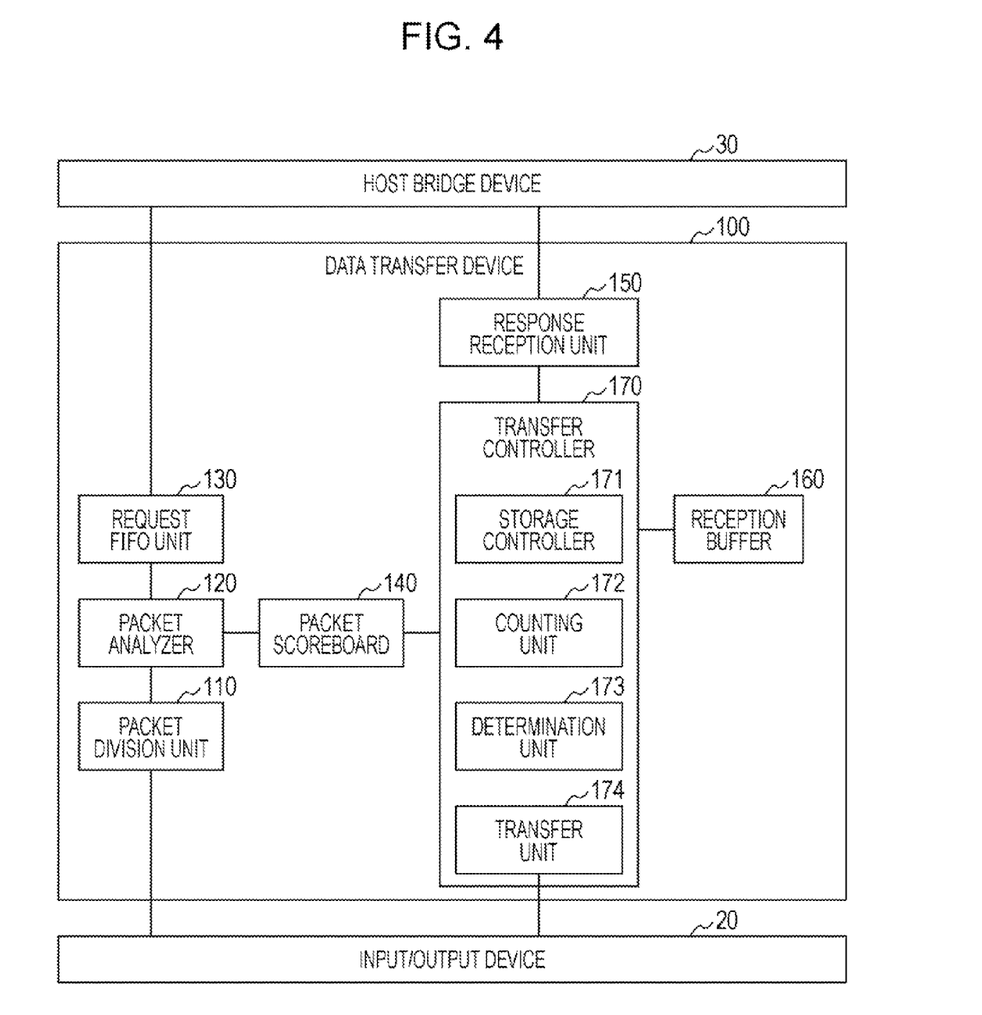
FIG. 4 is a block diagram illustrating a configuration of the data transfer device according to the present embodiment.

Next, the configuration of the data transfer device 100 according to the present embodiment will be described with reference to FIG. 4. FIG. 4 is a block diagram illustrating the configuration of the data transfer device 100 according to the present embodiment. As illustrated in the figure, the data transfer device 100 includes a packet division unit 110, a packet analyzer 120, a request FIFO unit 130, a packet scoreboard 140, a response reception unit 150, a reception buffer 160, and a transfer controller 170. The functional units in the data transfer device 100, such as the packet division unit 110, the packet analyzer 120, the packet scoreboard 140, and the transfer controller 170, may be implemented as hardware logic but also be realized by a processor (not illustrated).

When having received a request packet from the input/output device 20, the packet division unit 110 divides the received request packet into packets having specified sizes and transfers the packets to the packet analyzer 120. For example, the packet division unit 110 divides the request packet into packets so that each of the packets has a packet size the host bridge device 30 may receive at one time, and transfers the packets to the packet analyzer 120. In addition, the packet division unit 110 causes the header portion of each divided request packet to include the division number of the request packet as the division number of response data transferred from the host bridge device 30.

By analyzing each request packet divided by the packet division unit 110, the packet analyzer 120 generates a request for requesting the transfer of data, and transfers the generated request to the request FIFO unit 130. In addition, by analyzing each request packet divided by the packet division unit 110, the packet analyzer 120 extracts the division numbers of the command, the tag, and the response data, and writes the extracted division numbers of the command, the tag, and the response data into the packet scoreboard 140.

The request FIFO unit 130 inputs and output a request on the basis of the FIFO method. Specifically, the request FIFO unit 130 causes requests transferred from the packet analyzer 120 to be sequentially input, and causes the requests to be transferred to the host bridge device 30 in the order of causing the requests to be input.

The packet scoreboard 140 stores therein various kinds of information included in a request packet. Specifically, the packet scoreboard 140 stores therein the division number of response data included in the request packet divided by the packet division unit 110, with associating the division number with the tag. The packet scoreboard 140 is an example of a division number storage unit.

Figure 5:
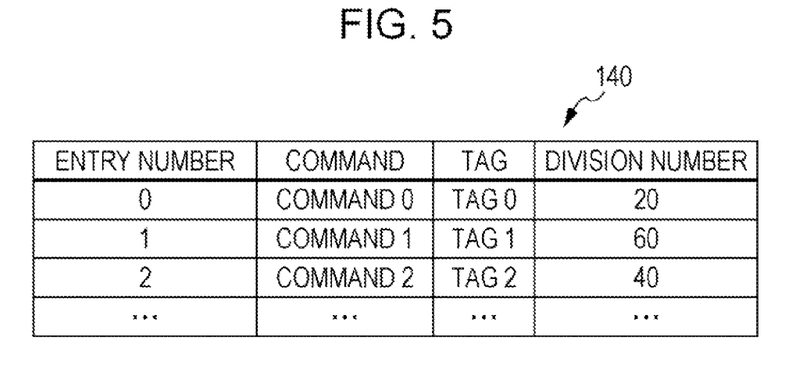
FIG. 5 is a diagram illustrating an example of a packet scoreboard.

FIG. 5 is a diagram illustrating an example of the packet scoreboard 140. As illustrated in FIG. 5, the packet scoreboard 140 stores therein items such as an entry number, a command, a tag, and a division number with associating the items with one another. The entry number indicates an identification number used for uniquely identifying the entry of the request packet. The command is a command included in the request packet, and is written by the packet analyzer 120. The tag is a tag included in the request packet, and is written by the packet analyzer 120. The division number is the division number of the response data included in the request packet, and is written by the packet analyzer 120.

In the example illustrated in FIG. 5, a request packet having an entry number "0" includes a "command 0" and a "tag 0", and indicates that the division number of the response data is "20". In addition, a request packet having an entry number "1" includes a "command 1" and a "tag 1", and indicates that the division number of the response data is "60". In addition, a request packet having an entry number "2" includes a "command 2" and a "tag 2", and indicates that the division number of the response data is "40".

The response reception unit 150 receives response data transferred from the host bridge device 30, and transfers the received response data to the transfer controller 170.

Figure 6:
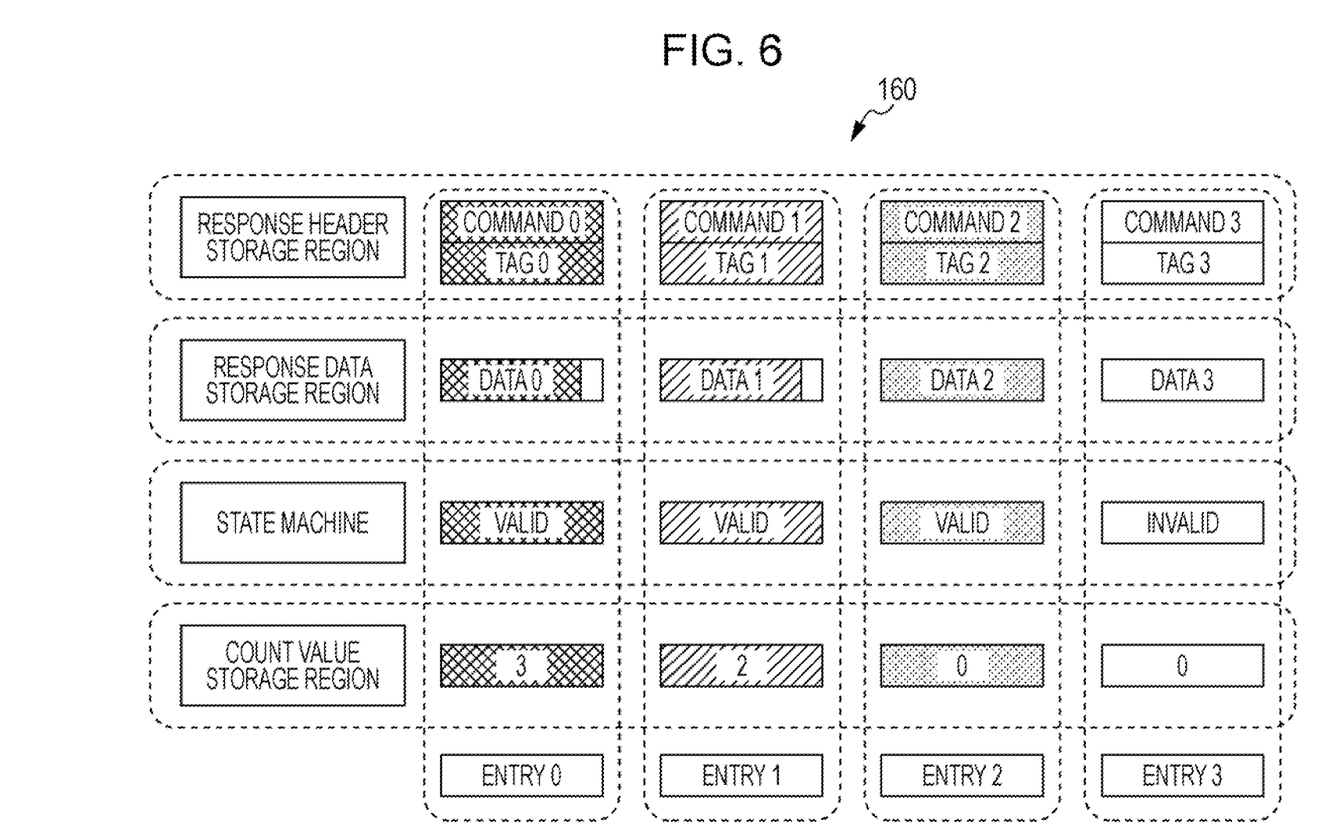
FIG. 6 is a diagram illustrating an example of a reception buffer.

The reception buffer 160 stores therein the response data transferred from the transfer controller 170. FIG. 6 is a diagram illustrating an example of the reception buffer 160. As illustrated in the figure, the reception buffer 160 is a buffer divided into a response header storage region, a response data storage region, a state machine, and a count value storage region, with respect to each entry.

The entry is a group in which the response header storage region, the response data storage region, the count value storage region are associated with one another. The response header storage region is a storage region in the entry, in which the command and the tag included in the response packet are stored. The response data storage region is a storage region in the entry, in which the data portion of the response packet is stored. The state machine is a flag indicating whether or not the response header storage region and the response data storage region store therein the response packet. For example, when the state machine is "valid", the state machine indicates that the response header storage region and the response data storage region store therein the response packet. In addition, for example, when the state machine is "invalid", the state machine indicates that the response header storage region and the response data storage region are in empty states in which no response packet is stored. A value stored in the count value storage region is a numerical value used for counting a response data amount stored in the response data storage region.

Returning to FIG. 4, the transfer controller 170 controls the transfer of response data for the input/output device 20. Specifically, the transfer controller 170 includes a storage controller 171, a counting unit 172, a determination unit 173, and a transfer unit 174.

The storage controller 171 stores a response packet, transferred from the response reception unit 150, in the reception buffer 160 with respect to each identification information used for identifying the response packet. In the present embodiment, the storage controller 171 adopts a combination of a command and a tag included in the response packet, as the identification information used for identifying the response packet.

Specifically, the storage controller 171 compares the command and the tag included in the response packet with a command and a tag stored in the response header storage region in each entry of the reception buffer 160. In addition, when the combinations of the commands and the tags do not match each other, the storage controller 171 stores the command and the tag included in the response packet in an empty response header storage region, from among entries in the reception buffer 160. Furthermore, the storage controller 171 stores data included in the response packet in an empty response data storage region. In addition, the storage controller 171 sets a corresponding state machine in the reception buffer 160 to "valid".

On the other hand, when the combinations of the commands and the tags match each other, the storage controller 171 stores the response data in the response data storage region in an entry where the combinations of the commands and the tags match each other, from among entries in the reception buffer 160.

The counting unit 172 counts a response data amount stored in the reception buffer 160 by the storage controller 171, with respect to each identification information used for identifying the response data. Specifically, the counting unit 172 acquires, from the packet scoreboard 140, the division number corresponding to the combination of the command and the tag stored by the storage controller 171 in the empty response header storage region in the reception buffer 160. In addition, the counting unit 172 sets a numerical value, obtained by subtracting "1" from the acquired division number, in the initial value of a corresponding count value storage region in the reception buffer 160. In addition, every time the storage controller 171 stores the response data in a response data buffer in an entry of the reception buffer 160, the counting unit 172 decrements the value of the corresponding count value storage region.

The determination unit 173 determines whether or not the response data amount counted by the counting unit 172 matches the division number of the response data. Specifically, when the determination unit 173 determines whether or not the value of the count value storage region, set by the counting unit 172, has become "0" and the value of the count value storage region has become "0", the determination unit 173 determines that the response data amount stored in the reception buffer 160 has matched the division number of the response data, and notifies the transfer unit 174 of that effect.

The transfer unit 174 reads out, from the reception buffer 160, the response data corresponding to identification information where the determination unit 173 determines that the response data amount has matched the division number of the response data, and then the transfer unit 174 transfers the response data to the input/output device 20. Specifically, when the transfer unit 174 has received, from the determination unit 173, notification that the response data amount stored in the reception buffer 160 has matched the division number of the response data, the transfer unit 174 reads out, from within an entry in the reception buffer 160, the response data where the value of the count value storage region has become "0". Namely, the transfer unit 174 reads out the command and the tag from the response header storage region where the value of the count value storage region has become "0", and the transfer unit 174 also reads out the data portion of the response data from the response data storage region. When the reception buffer 160 illustrated in FIG. 6 is cited as an example and described, the transfer unit 174 reads out a command 2 and a tag 2 from the response header storage region of an entry 2 where the value of the count value storage region has become "0", and the transfer unit 174 also reads out data 2 from the response data storage region of the entry 2.

In addition, by adding, as a header portion, the read out command and tag to the response data, the transfer unit 174 generates a response packet, and transfers the generated response packet to the input/output device 20. In addition, after transferring the response packet, the transfer unit 174 changes a corresponding state machine in the reception buffer 160 to "invalid".

Figure 7:
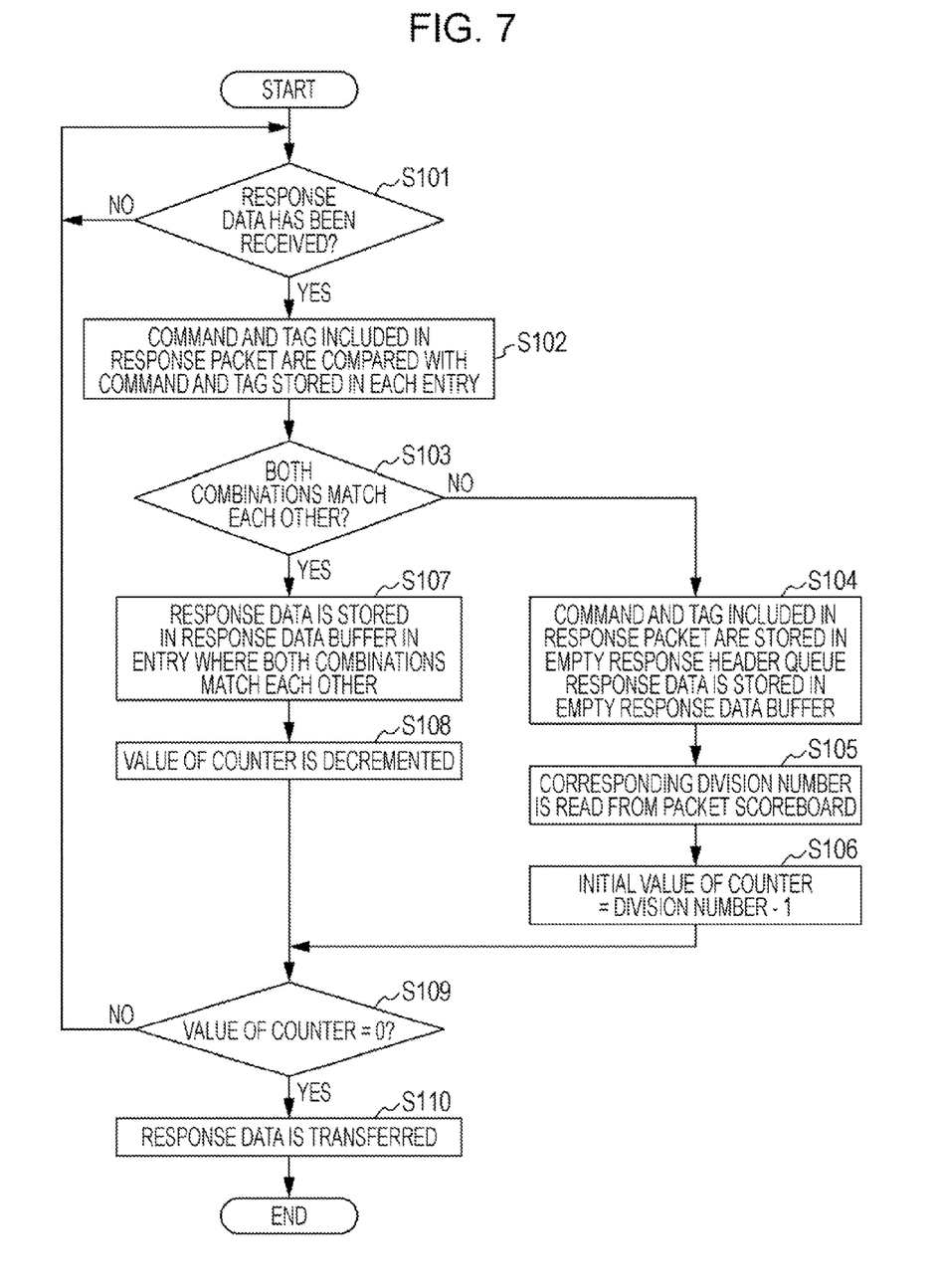
FIG. 7 is a flowchart illustrating a processing procedure of data transfer processing performed by the data transfer device according to the present embodiment.

Next, data transfer processing performed by the data transfer device 100 according to the present embodiment will be described with reference to FIG. 7. FIG. 7 is a flowchart illustrating the processing procedure of the data transfer processing performed by the data transfer device 100 according to the present embodiment.

As illustrated in the figure, when having received response data (Step S101: affirmative), the storage controller 171 compares the command and the tag included in the response packet with the command and the tag stored in the response header storage region in each entry of the reception buffer 160 (Step S102).

In addition, when the combinations of the commands and the tags do not match each other (Step S103: negative), the storage controller 171 stores the command and the tag included in the response packet in an empty response header storage region, from among entries in the reception buffer 160. Furthermore, the storage controller 171 stores the response data in an empty response data storage region (Step S104). In addition, the storage controller 171 sets a corresponding state machine in the reception buffer 160 to "valid".

Subsequently, the counting unit 172 acquires, from the packet scoreboard 140, the division number corresponding to the combination of the command and the tag stored in the empty response header storage region in the reception buffer 160 (Step S105). In addition, the counting unit 172 sets a numerical value, obtained by subtracting "1" from the acquired division number, in the initial value of a corresponding count value storage region in the reception buffer 160 (Step S106), and moves the processing to Step S109.

On the other hand, when the combinations of the commands and the tags match each other (Step S103: affirmative), the storage controller 171 stores the response data in the response data storage region in an entry in the reception buffer 160 where the combinations of the commands and the tags match each other (Step S107).

In addition, since the storage controller 171 stores the response data in the response data storage region in an entry of the reception buffer 160, the counting unit 172 decrements the value of a corresponding count value storage region (Step S108), and moves the processing to Step S109.

Subsequently, the determination unit 173 determines whether or not the value of the count value storage region, set by the counting unit 172, has become "0" (Step S109). When the value of the count value storage region has not become "0" yet (Step S109: negative), the determination unit 173 returns the processing to Step S101, and waits for the reception of the response data.

On the other hand, when the value of the count value storage region has become "0" (Step S109: affirmative), the determination unit 173 determines that the response data amount stored in the reception buffer 160 has matched the division number of the response data, and notifies the transfer unit 174 of that effect. The transfer unit 174, which has received notification that the response data amount stored in the reception buffer 160 has matched the division number of the response data, reads out, from within an entry in the reception buffer 160, the response data where the value of the count value storage region has become "0", and transfers the response data to the input/output device 20 (Step S110). Namely, the transfer unit 174 reads out the command and the tag from the response header storage region where the value of the count value storage region has become "0", and the transfer unit 174 also reads out the response data from the response data storage region. In addition, by adding, as a header portion, the read out command and tag to the response data, the transfer unit 174 generates a response packet, and transfers the generated response packet to the input/output device 20. In addition, after transferring the response packet, the transfer unit 174 changes a corresponding state machine in the reception buffer 160 to "invalid".

As described above, the data transfer device 100 stores the response packet, transferred from the host bridge device 30 in response to the request packet from the input/output device 20, in the reception buffer 160 with respect to each combination of the command and the tag. In addition, the data transfer device 100 reads out, from the reception buffer 160, the response data corresponding to the command and the tag, whose response data amount matches the division number of the response data, and transfers the response data to the input/output device 20. Therefore, it is not desirable for the data transfer device 100 to transfer the response data in accordance with the order of the reception of the response data in the same way as a technique of the related art adopting the FIFO method, and it is possible to promptly transfer the response data in so far as the response data amount matches the division number of the response data. As a result, since the data transfer device 100 may perform overtaking between pieces of the response data, it is possible to improve the throughput of the device.

In addition, using the division number of the response data, the data transfer device 100 according to the present embodiment sets the initial value of the count value storage region, and decrements the value of the count value storage region every time the response data is stored in the reception buffer 160. In addition, when the value of the count value storage region has become "0", the data transfer device 100 determines that the response data amount has matched the division number of the response data, reads out the corresponding response data from the reception buffer 160, and transfers the response data to the input/output device 20. Therefore, since the data transfer device 100 may count the response data amount on the basis of an easy processing operation in which the value of the count value storage region is decremented, it is possible to speed up overtaking between pieces of the response data, and it is also possible to further improve the throughput of the device.

Incidentally, in the present embodiment, the example has been described in which the packet division unit 110 that has received the request packet from the input/output device 20 divides the received request packet into packets having specified sizes and transfers the packets to the packet analyzer 120. However, a case may also be considered in which the input/output device 20 transfers, to the data transfer device 100, the request packet preliminarily divided into specified sizes. In this case, a configuration may be adopted in which the packet division unit 110 is omitted from the data transfer device 100. In this way, on the basis of the configuration in which the packet division unit 110 is omitted, it is also possible to obtain the same advantageous effect as the present embodiment.

In addition, while, in the present embodiment, the combination of the command and the tag included in the response packet is adopted as the identification information used for identifying the response data, only the tag may also be adopted. In this case, the storage controller 171 compares a tag included in the response packet with a tag stored in the response header storage region in each entry of the reception buffer 160, and stores response data in the reception buffer 160 in accordance with the comparison result.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiment of the present invention has been described in detail, it should be understood that the various changes, substitutions, and alterations could be made hereto without departing from the spirit and scope of the invention.

What is claimed is:

1. A data transfer device comprising:
    a storage controller that stores received response data in a buffer with respect to each piece of identification information included in the response data when receiving the response data from a first device, the response data being transferred from the first device in response to a transfer request transferred from a second device;

a division number storage unit that stores a division number indicating a number of pieces of the response data that are to be received from the first device, in association with the identification information when receiving the transfer request, from the second device;

a counting unit that counts a count number indicating a number of pieces of the response data stored in the buffer by the storage controller with respect to each piece of the identification information;

a determination unit that determines whether the count number counted by the counting unit reaches the division number; and a transfer unit that reads, from the buffer, the division number of pieces of the response data corresponding to the identification information, and transfers the read response data to the second device, wherein the counting unit counts the second number by obtaining the first number corresponding to the identification information of the response data from the division number storage unit, sets an initial value of a counter of the counting unit by using the obtained division number, and decrementing a value of the counter when receiving the response data from the storage controller;

the determination unit determines that the count number reaches the division number when the value of the counter is "0"; and the transfer unit reads, from the buffer, the response data corresponding to the identification information for which the count number for the corresponding response data has been determined to reach the division number by the determination unit, and transfers the read response data to the second device.

2. The data transferring device according to claim 1, wherein the buffer includes a plurality of entries each of which is a group of data in which a response header storage region that stores the identification information, a response data storage region that stores the response data with respect to each piece of the identification information, and a count value storage region that stores a numerical value used for counting the response data are associated as a group, and the storage controller, stores the response data in the response data storage region of an entry corresponding to the response header storage region when the identification information of the received response data is stored in at least one of the response header storage regions, and stores the received identification information of the response data in an empty entry of the response header storage region and stores the received response data in the empty entry of the response data storage region, when the identification information of the received response data is not stored in any of the response header storage regions, and the counting unit updates the numerical value stored in the count value storage region of the entry corresponding to the response header storage region in which the identification information of the received response data is stored.

3. A data transfer method performed by a data transfer device including a storage controller, a counting unit, a determination unit, a division number storage unit, and a transfer unit, the data transfer method comprising:

storing, by the storage controller, received response data in a buffer with respect to each piece of identification information included in the response data when receiving the response data from a first device, the response data being transferred from the first device in response to a transfer request transferred from a second device;

storing, by the division number storage unit, a division number indicating a number of pieces of the response data that are to be received from the first device, in association with the identification information when receiving the transfer request, from the second device;

counting, by the counting unit, a count number indicating a number of pieces of the response data stored in the buffer by the storage controller with respect to each piece of the identification information;

determining, by the determination unit, whether the count number counted by the counting unit reaches the division number; and reading, by the transfer unit, from the buffer, the division number of pieces of the response data corresponding to the identification information, and transferring the read response data to the second device, wherein the counting unit counts the second number by obtaining the first number corresponding to the identification information of the response data from the division number storage unit, sets an initial value of a counter of the counting unit by using the obtained division number, and decrementing a value of the counter when receiving the response data from the storage controller;

the determination unit determines that the count number reaches the division number when the value of the counter is "0"; and the transfer unit reads, from the buffer, the response data corresponding to the identification information for which the count number for the corresponding response data has been determined to reach the division number by the determination unit, and transfers the read response data to the second device.

4. A data transfer method executed by a processor, the data transfer method comprising:

storing received response data in a buffer with respect to each piece of identification information included in the response data when receiving the response data from a first device, the response data being transferred from the first device in response to a transfer request transferred from a second device;

storing a division number indicating a number of pieces of the response data that are to be received from the first device, in association with the identification information when receiving the transfer request, from the second device;

counting a count number indicating a number of pieces of the response data stored in the buffer with respect to each piece of the identification information;

determining whether the counted count number reaches the division number; and reading, from the buffer, the division number of pieces of the response data corresponding to the identification information, and transferring the read response data to the second device, wherein the counting unit counts the second number by obtaining the first number corresponding to the identification information of the response data from the division number storage unit, sets an initial value of a counter of the counting unit by using the obtained division number, and decrementing a value of the counter when receiving the response data from the storage controller;

the determination unit determines that the count number reaches the division number when the value of the counter is "0"; and the transfer unit reads, from the buffer, the response data corresponding to the identification information for which the count number for the corresponding response data has been determined to reach the division number by the determination unit, and transfers the read response data to the second device.

* * * * *